United States Patent [19]

Nishikawa et al.

[11] 4,151,761

[45] May 1, 1979

[54] AIR BREATHER FOR POWER TRANSMISSION UNIT

[75] Inventors: Kazuyoshi Nishikawa; Tetsuzou Yoneda, both of Toyota, Japan

[73] Assignee: Toyota Jidosha Kogyo Kabushiki Kaisha, Aichi, Japan

[21] Appl. No.: 894,175

[22] Filed: Apr. 6, 1978

[30] Foreign Application Priority Data

Oct. 3, 1977 [JP] Japan .................... 52-132996[U]

[51] Int. Cl.$^2$ ............................................. F16H 57/02
[52] U.S. Cl. .................................................. 74/606 A
[58] Field of Search ........................... 74/606 A, 606 R

[56] References Cited

U.S. PATENT DOCUMENTS

| | | | |
|---|---|---|---|
| 1,595,020 | 8/1926 | Nadler | 74/606 A |
| 1,872,862 | 8/1932 | Wise | 74/606 |
| 2,687,784 | 8/1954 | Klackner | 74/606 A X |
| 3,234,808 | 2/1966 | Nelson | 74/606 X |
| 3,722,321 | 3/1973 | Walker et al. | 74/606 R |

FOREIGN PATENT DOCUMENTS 1550835  6/1969  Fed. Rep. of Germany ........ 74/606 A

*Primary Examiner*—Lance W. Chandler
*Attorney, Agent, or Firm*—Armstrong, Nikaido, Marmelstein & Kubovcik

[57] ABSTRACT

A power transmission unit comprises a trans-axle casing rigidly secured to a cylinder block of an engine and having an upper compartment to contain a clutch for connection to a crankshaft of the engine and a lower compartment to contain a final drive gearing and a differential gear unit connected to each other, a transmission casing sealingly jointed at the upright front face thereof to the upright rear face of the trans-axle casing to contain a change-speed gear transmission drivingly connected to an output shaft of the clutch and coaxially connected to the final drive gearing, and an intermediate plate interposed between the casings to partly support thereon the output shaft of the clutch and the component shafts of the change-speed gear transmission. In the transmission unit, an air breather is provided on a head portion of the intermediate plate to prevent the flow of lubrication oil out from the casings and entrance of water into the casings.

6 Claims, 4 Drawing Figures

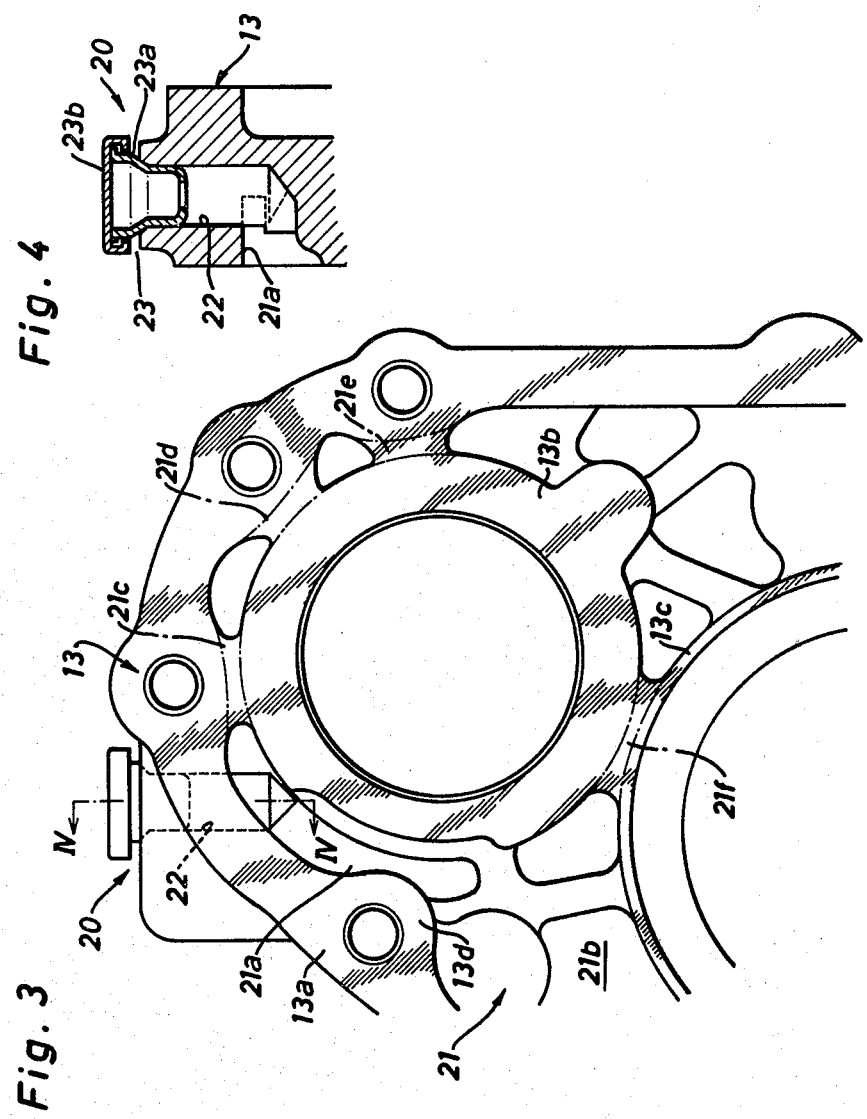

AIR BREATHER FOR POWER TRANSMISSION UNIT

BACKGROUND OF THE INVENTION

The present invention relates to a power transmission unit for an automotive vehicle, and more particularly to a power transmission unit of the type which comprises a trans-axle casing rigidly secured to a cylinder block of an engine and having an upper compartment to contain a clutch for connection to a crankshaft of the engine and a lower compartment to contain a final drive gearing and a differential gear unit connected to each other, a transmission casing sealingly jointed at the upright front face thereof to the upright rear face of the trans-axle casing to contain a change-speed gear transmission drivingly connected to an output shaft of the clutch and coaxially connected to the final drive gearing, and an intermediate plate interposed between the casings to partly support thereon the output shaft of the clutch and the component shafts of the change-speed gear transmission.

In such a power transmission unit of the type described above, lubrication oil stored in the casings is stirred up by rotation of the change-speed gear transmission, the final drive gearing and the differential gear unit, and additionally the lubrication oil is transferred fore and aft when the vehicle is ascending and descending a hill. To provide an air breather on the power transmission unit, it is, therefore, required to prevent the flow of lubrication oil out from the casings and entrance of water in washing the vehicle.

SUMMARY OF THE INVENTION

The primary object of the present invention is to provide an improved power transmission unit wherein an air breather is provided on a head portion of the intermediate plate to fulfill the requirements described above.

According to the present invention, there is provided a power transmission unit for an automotive vehicle which comprises a trans-axle casing rigidly secured to a cylinder block of an engine and having an upper compartment to contain a clutch for connection to a crankshaft of the engine and a lower compartment to contain a final drive gearing and a differential gear unit connected to each other, a transmission casing sealingly jointed at the upright front face thereof to the upright rear face of the trans-axle casing to contain a change-speed gear transmission drivingly connected to an output shaft of the clutch and coaxially connected to the final drive gearing, and an upright intermediate plate interposed between the casings to partly support thereon the output shaft of the clutch and the component shafts of the change-speed gear transmission, the lower compartment of the trans-axle casing being interconnected to the interior of the transmission casing through the intermediate plate, and wherein the intermediate plate is provided with a vertical vent hole at the head portion thereof and with a recessed portion at the upright front face thereof to form an air passage communicating the vent hole into the interior of the casings and an air breather plug assembly is coupled over the vent hole to allow the flow of air out from the interior of the casings to the exterior through the air passage.

The power transmission unit is characterized in that the final drive gearing is supported by a pair of axially spaced bearings to subdivide the lower compartment of the trans-axle casing into front and intermediate chambers interconnected to each other through the bearings, the differential gear unit being connected to one end of a drive pinion shaft for the final drive gearing in the front chamber and an output shaft of the change-speed gear transmission being connected to the other end of the drive pinion shaft in the intermediate chamber, and that the recessed portion of the intermediate plate is communicated into the intermediate chamber.

Furthermore, the power transmission unit is characterized in that a driving gear wheel on the clutch output shaft, an input gear wheel for the change-speed gear transmission and an idler gear wheel in mesh with the driving gear wheel and the input gear wheel are arranged in an upright plane behind the intermediate plate within the transmission casing.

BRIEF DESCRIPTION OF THE DRAWINGS

The above-mentioned and further objects and features of the present invention will become clear from the following description with reference to the accompanying drawings, in which:

FIG. 3 is an enlarged view illustrating the upright front face of an intermediate plate of the transmission unit, showing a recessed portion provided on the upright front face; and FIG. 4 is a cross-sectional view taken along the plane of section line IV—IV in FIG. 3.

DESCRIPTION OF THE PREFERRED EMBODIMENT

Figure 1:
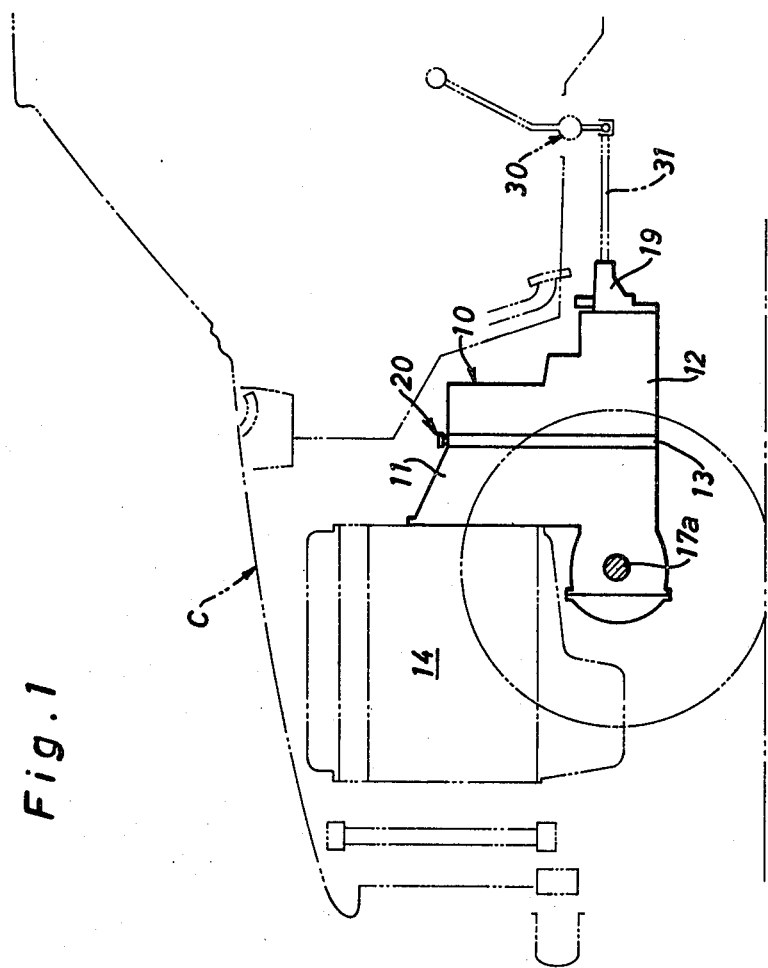
FIG. 1 is a schematic view of an automotive vehicle equipped with a power transmission unit is accordance with the present invention.
Figure 2:
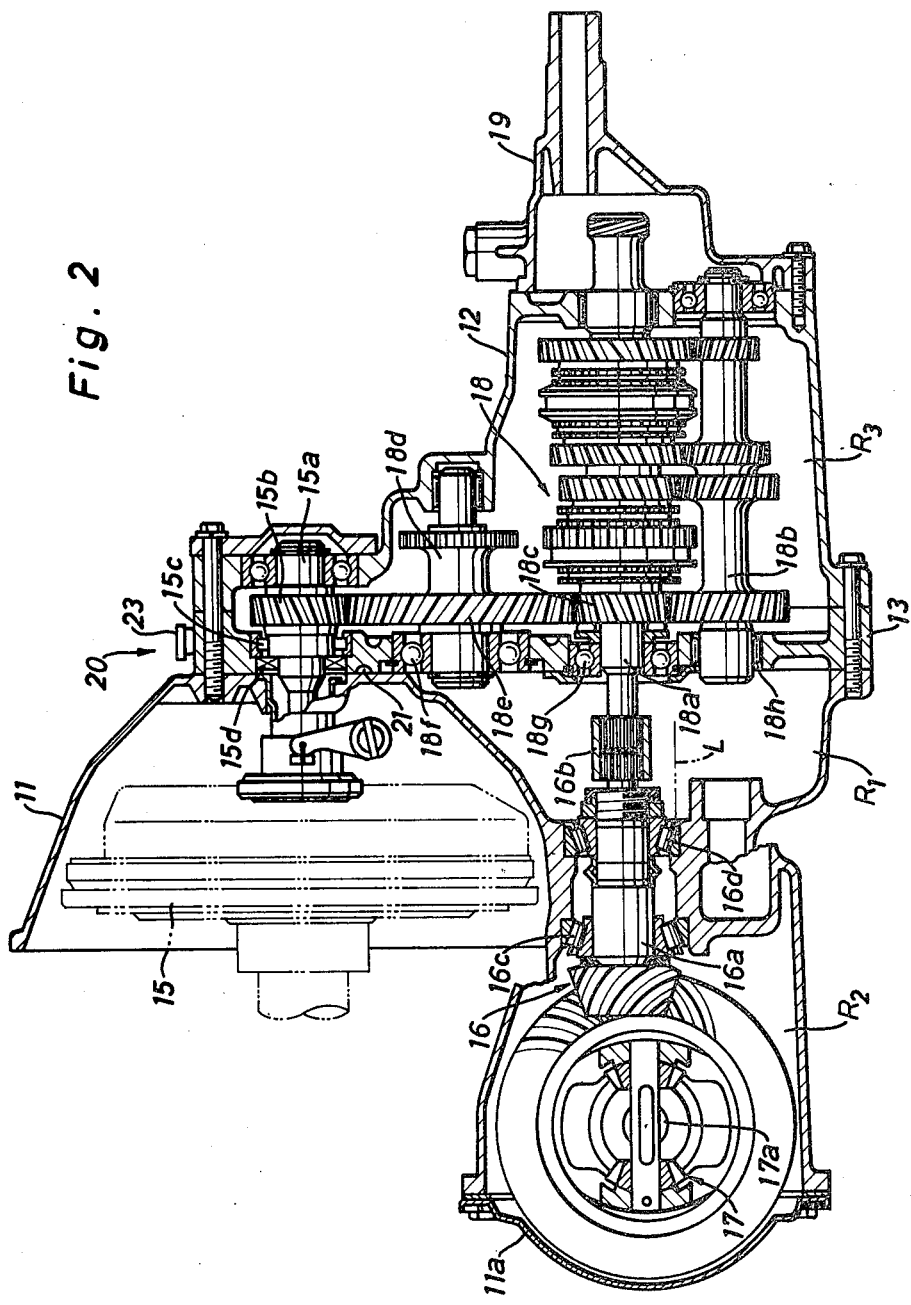
FIG. 2 is an axial sectional view of the transmission unit of FIG. 1 on an enlarged scale.

Referring now to the drawings, in particular to FIG. 1, there is illustrated a power transmission unit which is mounted on an automotive vehicle c of the type of front-engine and front-wheel drive. A housing assembly 10 for the transmission unit comprises a trans-axle casing 11 and a transmission casing 12 which are fluid-tightly jointed to each other by way of an upright intermediate plate 13. The trans-axle casing 11 is rigidly secured to an upright rear-face of a cylinder block of an engine 14 and is configured generally to conform with a friction clutch 15 contained in the upper compartment thereof and with a final drive gearing 16 and a differential gear unit 17 contained in the lower compartment thereof, as shown in FIG. 2. The lower compartment of the trans-axle casing 11 is sealingly closed by a dome-shaped cover plate 11a to retain lubricant oil within the casing 11. As clearly shown in FIG. 2, the transmission casing 12 is fluid-tightly secured at the upright front seating face thereof to the upright rear seating face of the trans-axle casing 11 by way of the intermediate plate 13 and is configured generally to conform with a change-speed gear transmission 18 contained therein. The change-speed gear transmission 18 is drivingly connected at one hand thereof to a crankshaft of the engine 14 through the clutch 15 and connected at the other hand thereof to the differential gear unit 17 through the final drive gearing 16. In addition, a rear-end housing 19 is fluid-tightly secured to the rear end-face of the transmission casing 12 to complete the housing assembly 10.

The change-speed gear transmission 18 includes an output shaft 18a which is supported by a ball bearing 18g in the intermediate plate 13 and a roller bearing in the transmission casing 12 and is also provided thereon with a plurality of gear wheels of differing sizes. The gear wheels on the output shaft 18a are respectively in mesh with a plurality of gear wheels provided on a layshaft 18b, the selection of gear ratios being effected by a gearshift mechanism 30 (shown in FIG. 1) which is operatively connected through a mechanical linkage 31 to a pair of synchronizers on the output shaft 18a and is arranged to operate selectively the synchronizers to thereby provide different forward speed ratios.

The layshaft 18b is supported by a roller bearing 18h in the intermediate plate 13 and a ball bearing in the transmission casing 12 and is located substantially at the same height above the ground level as the output shaft 18a and in parallel with the same. In FIG. 2, the layshaft 18b is, however, illustrated at a position lower than the output shaft 18a to clearly depict the meshing condition of the gear tranmission 18. An input gear wheel 18c is rotatable on the output shaft 18a adjacent to the ball bearing 18g and is meshed with an idler gear wheel 18e which is formed integral with an idler shaft 18d. The idler gear wheel 18e is in mesh with a driving gear wheel 15b which is formed integral with a clutch shaft 15a. The output shaft 18a is also coaxially connected to a drive pinion shaft 16a of the final drive gearing 16 by means of a spline coupling 16b.

The idler shaft 18d is supported at one end thereof by a ball bearing 18f in the intermediate plate 13 and at the other end thereof by a roller bearing in the transmission casing 12. The clutch shaft 15a is supported by a roller bearing 15c and is surrounded by a seal member 15d to keep foreign matter out of the casing 12 and to retain lubricant oil within the casing 12, the clutch shaft 15a being supported at the opposite end thereof by a ball bearing in the transmission casing 12. The drive pinion shaft 16a is supported in the trans-axle casing 11 by a pair of tapered roller bearings 16c and 16d. Additionally, the trans-axle casing 11 is fluid-tightly closed at the lower compartment thereof by a seal member surrounding a wheel axle 17a extending outwardly from the differential gear unit 17, and the rear end housing 19 is also fluid-tightly closed by a seal member surrounding the mechanical linkage 31.

In FIGS. 3 and 4, there is illustrated an air-breather device 20 in accordance with the present invention which comprises a breather plug assembly 23 mounted on a head portion of the intermediate plate 13. The intermediate plate 13 has recessed portion 21 which is formed on the upright front face of the plate 13 and is communicated into a vertical vent hole 22. The vent hole 22 is closed by the breather plug assembly 23 to allow the flow of air therethrough. The breather plug assembly 23 includes a cup-shaped body 23a fixedly engaged with an upper opening of the vent hole 22 and a cap member 23b loosely coupled over an annular flange of the body 23a.

In manufacturing the intermediate plate 13, the recessed portion 21 is provided by making the intermediate plate 13 thin at an appropriate portion other than a peripheral seating portion 13a, an upper bearing portion 13b for the clutch shaft 15a and a lower bearing portion 13c for the idler shaft 18d. Thus, the recessed portion 21 includes a first part 21a formed between the peripheral seating portion 13a and the bearing portion 13b and a second part 21b surrounded by the peripheral seating portion 13a and the bearing portions 13b and 13c. The second part 21b of the recessed portion 21 is communicated at the upper side thereof into the vent hole 22 through the first part 21a and is also communicated at the lower side thereof into an intermediate chamber $R_1$, which is formed behind the roller bearing 16d of the drive pinion shaft 16a in the trans-axle casing 11. A front chamber $R_2$ formed in the trans-axle casing 11 is communicated with intermediate chamber $R_1$ through the pair of roller bearings 16c and 16d and an axial passage (not shown) thereby to allow transfer of lubrication oil and air between the chambers $R_1$ and $R_2$. Furthermore, the intermediate chamber $R_1$ is communicated with rear chamber $R_3$ in the transmission casing 12 through the bearings 18f, 18g and 18h to allow transfer of lubrication oil and air between the chambers $R_1$ and $R_3$. In FIG. 2, an imaginary line L illustrates a liquid surface of the lubrication oil in the housing assembly 10 during operation of the transmission unit. From the above description, it will be noted that the recessed portion 21 serves to provide an air passage at the jointed portion of the trans-axle casing 11 and the intermediate plate 13.

In operation of the power transmission unit, the lubrication oil stored in the front and rear chambers $R_2$ and $R_3$ is stirred up and fully scattered by rotation of the final drive gearing 16, the differential gear unit 17 and the change-speed gear transmission 18. The scattered oil in the front chamber $R_2$ flows downward along the inner wall of the trans-axle casing 11 to lubricate the roller bearings 16c and 16d, and also the scattered oil in the rear chamber $R_3$ flows downward along the inner walls of the transmission casing 12 and the intermediate plate 13 to lubricate the bearings for the respective shafts 18a, 18b, 18d and 15a. When the temperature in the housing assembly 10 rises up due to the friction of heat of the gear wheels and/or the increase of the ambient temperature, the air as well as the lubrication oil inflates to increase the pressure in the housing assembly 10. As a result, the compressed air in the intermediate chamber $R_1$ flows upwardly through the air passage formed by the recessed portion 21 and is exhaused out from the vent hole 22 to the exterior through the air breather plug 23. In this instance, the air in the front chamber $R_2$ is separated from the scattered lubrication oil by passing through the bearings 16c and 16d and flows into the intermediate chamber $R_1$. Similarly, the air in the rear chamber $R_3$ is separated from the scattered lubrication oil by passing through the bearings 18f, 18g and 18h and flows into the intermediate chamber $R_1$. Thus, the air flowed into the chamber $R_1$ flows upwardly to be exhausted through the air passage as described above.

In the embodiment mentioned above, since the air breather plug 23 is located at the head portion of the upright intermediate plate 13, which is a high position above the ground and deep inside the engine room of the vehicle, any water or dirty water does not enter into the housing assembly 10 even when the vehicle is washed by water or in travelling on a muddy road. In a modification of the present invention, the recessed portion 21 on the front face of the intermediate plate 13 may be formed with additional recessed parts 21c, 21d and 21e which are formed around the bearing portion 13b for the clutch shaft 15a, as shown by imaginary lines in FIG. 3.

While a particular embodiment of power transmission unit has been shown and described above, it will be obvious that various modifications can be made without departing from the spirit of the invention and the scope of the appended claims. For example, it is clearly noted that the present invention may be adapted to an automotive vehicle of the type of rear-engine and rear-wheel drive.

What is claimed is:

1. In combination with a power transmission unit for an automotive vehicle comprising a trans-axle casing rigidly secured to a cylinder block of an engine and having an upper compartment to contain a clutch for connection to a crankshaft of said engine and a lower compartment to contain a final drive gearing and a differential gear unit connected to each other; a transmission casing sealingly jointed at the upright front face thereof to the upright rear face of said trans-axle casing to contain a change-speed gear transmission drivingly connected to an output shaft of said clutch and coaxially connected to said final drive gearing; and an upright intermediate plate interposed between said casings to partly support thereon the output shaft of said clutch and the component shafts of said change-speed gear transmission, the lower compartment of said trans-axle casing and the interior of said transmission casing being interconnected through said intermediate plate;

the improvement wherein said intermediate plate is provided with a vertical vent hole at the head portion thereof and with a recessed portion at the upright front face thereof to form an air passage communicating said vent hole into the interior of said casings and wherein an air breather plug assembly is coupled over said vent hole to allow the flow of air out from the interior of said casings to the exterior through said air passage.

2. A power transmission unit as claimed in claim 1, wherein said final drive gearing is supported by a pair of axially spaced bearings to subdivide the lower compartment of said trans-axle casing into front and intermediate chambers interconnected to each other through said bearings, said differential gear unit being connected to one end of a drive pinion shaft for said final drive gearing in said front chamber and an output shaft of said change-speed gear transmission being connected to the other end of said drive pinion shaft in said intermediate chamber, and wherein said recessed portion of said intermediate plate is communicated into said intermediate chamber.

3. A power transmission unit as claimed in claim 1, wherein a driving gear wheel on the clutch output shaft, an input gear wheel for said change-speed gear transmission and an idler gear wheel in mesh with said driving gear wheel and said input gear wheel are arranged in a common upright plane behind said intermediate plate within said transmission casing.

4. A power transmission unit as claimed in claim 3, wherein the upright front face of said intermediate plate is formed with a peripheral seating portion for engagement with the upright rear seating face of said trans-axle casing, an upper bearing portion for the clutch output shaft and a lower bearing portion for an idler shaft integral with said idler gear wheel, and wherein said recessed portion of said intermediate plate includes a first recessed part formed between the peripheral portion and the upper bearing portion and a second recessed part surrounded by the peripheral portion, and the upper and lower bearing portions, said first recessed part being communicated into said vent hole and said second recessed part being communicated at its upper side with said first recessed part and at its lower side into the interior of said casings.

5. A power transmission unit as claimed in claim 4, wherein the upper bearing portion of said intermediate plate is sealed by a seal member surrounding the clutch output shaft.

6. A power transmission unit as claimed in claim 5, wherein said recessed portion of said intermediate plate further includes a third recessed part formed around the upper bearing portion for the clutch output shaft.

* * * * *